H. TREMBLAY.
METHOD OF MAKING SPECTACLE FRAMES AND SIMILAR ARTICLES.
APPLICATION FILED MAR. 10, 1921.
1,425,919.
Patented Aug. 15, 1922.
2 SHEETS—SHEET 1.
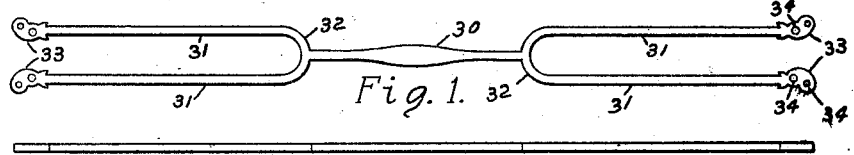
Fig. 1.
Fig. 2.
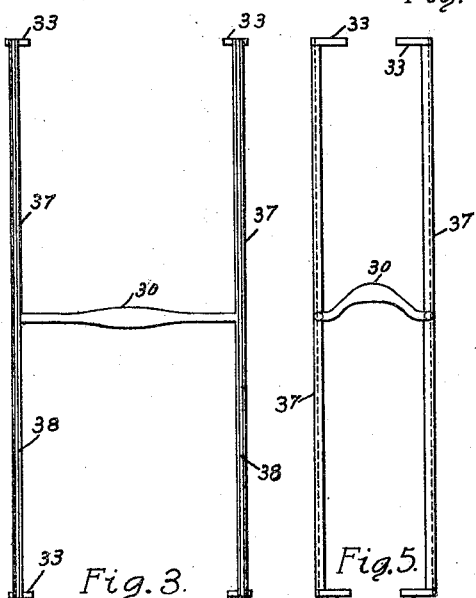
Fig. 3.
Fig. 5.
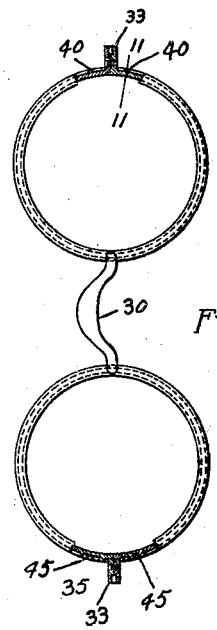
Fig. 10.
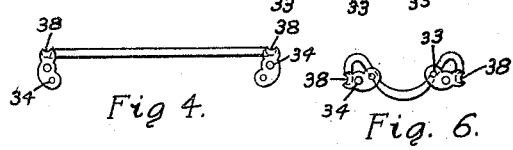
Fig. 4.
Fig. 6.
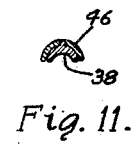
Fig. 11.
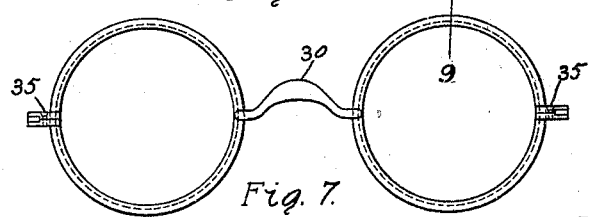
Fig. 7.
Fig. 9.
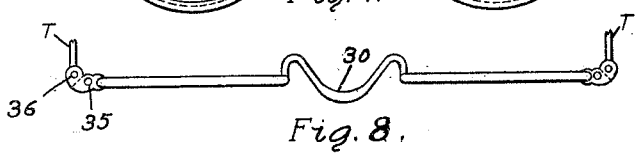
Fig. 8.
INVENTOR.
HORMIDAS TREMBLAY
BY
ATTORNEYS.

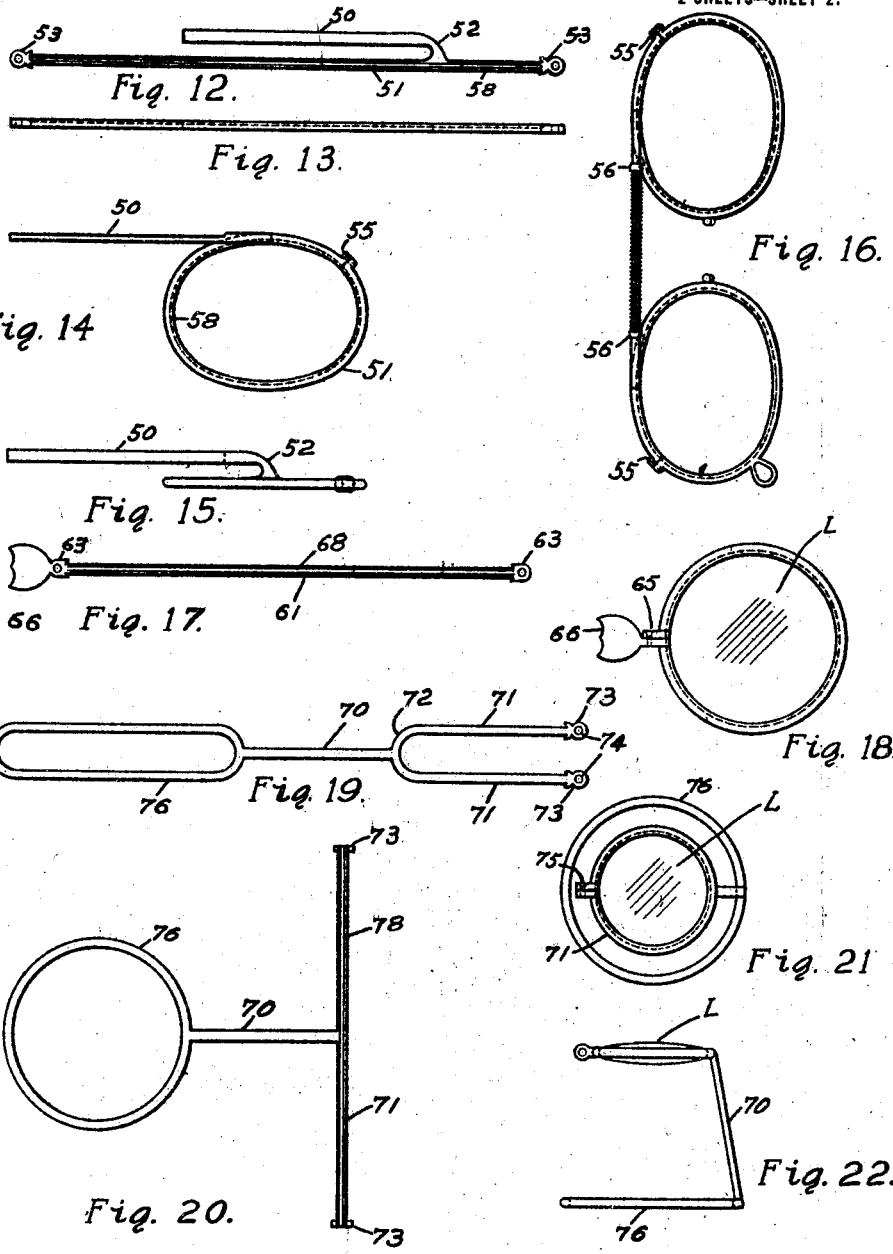

UNITED STATES PATENT OFFICE.

HORMIDAS TREMBLAY, OF SOUTHBRIDGE, MASSACHUSETTS.

METHOD OF MAKING SPECTACLE FRAMES AND SIMILAR ARTICLES.

1,425,919.　　　　Specification of Letters Patent.　Patented Aug. 15, 1922.

Application filed March 10, 1921. Serial No. 451,126.

*To all whom it may concern:*

Be it known that I, HORMIDAS TREMBLAY, a citizen of the United States, residing at Southbridge, in the county of Worcester and State of Massachusetts, have invented a new and useful Method of Making Spectacle Frames and Similar Articles, of which the following is a specification.

This invention relates to the manufacture of metal frames for spectacles, eye-glasses, microscopes, and other articles of a similar nature in which the interior wall of the frame or a part thereof has to be grooved to provide for holding a lens or the like therein.

The principal object of the invention is to provide an improved way of manufacturing such frames by which the amount of waste of sheet metal from which the frame is stamped will be reduced and there will be no need of soldering together the several parts of the frame. In this way economies of two kinds in the manufacture are introduced as will be obvious, and stronger frames are produced, weak spots being avoided.

The invention also involves improvements in the way of preparing and locating the ends by which the parts are secured together, the provision of means by which the frames can be covered with celluloid or other protective material, and various features of construction as will appear.

Reference is to be had to the accompanying drawings in which—

Fig. 1 is a plan of the first blank cut out from a sheet of metal and adapted to be used for forming a spectacle frame;

Fig. 2 is an edge view of the same;

Fig. 3 is a plan similar to Fig. 1 showing the next step of the operation;

Fig. 4 is an end view of the same;

Fig. 5 is a view similar to Fig. 3 showing the same blank after going through additional processes;

Fig. 6 is an end view of the same;

Fig. 7 is a plan showing the complete spectacle frame formed from the blank shown in Figs. 1, 3 and 5;

Fig. 8 is an edge view of the same;

Fig. 9 is a sectional view on enlarged scale on the line 9—9 of Fig. 7;

Fig. 10 is a view similar to Fig. 7 showing the use of this principle in the manufacture of a frame having a celluloid covering;

Fig. 11 is a sectional view on the line 11—11 of Fig. 10;

Fig. 12 is a plan of a blank cut from sheet metal for use in producing half of an eyeglass frame;

Fig. 13 is an edge view thereof;

Fig. 14 is a view in plan of the blank when substantially completed;

Fig. 15 is an edge view of the same;

Fig. 16 is a plan or front elevation of a pair of eyeglasses constructed from two of the pieces shown in Fig. 14;

Fig. 17 is a plan of a sheet metal blank cut out for use in making a flat microscope frame;

Fig. 18 is a plan of the complete microscope frame made therefrom;

Fig. 19 is a view similar to Fig. 1 showing a blank cut out from sheet metal for use in making a microscope stand;

Fig. 20 is a similar view showing the blank changed in shape;

Fig. 21 is a plan of the complete frame made therefrom; and

Fig. 22 is a side elevation of the same.

Referring to the first sheet of drawings I make a blank for the frame shown in Figs. 7 and 8 by cutting out from a sheet of the desired metal the blank shown in Figs. 1 and 2. This blank as stamped out originally comprises a bridge piece 30 at the center and two pairs of arms 31 extending therefrom at its ends. Each pair of arms is shown as connected with the bridge piece by a curve 32 centrally located with respect to the bridge piece. The two arms of each pair are shown as located near together and parallel with each other, as originally cut out, so that very little metal is wasted in the manufacture of the frame in accordance with this method. At the ends, these arms are provided with enlargements 33 constituting end pieces each having perforations 34 for the reception of a screw 35 in Fig. 8, and a pivot stud 36 for the temple. These holes are punched either at the original cutting-out operation or afterwards, and are finished finally for the purpose of receiving these elements. It will be noted from Fig. 2 that this blank is perfectly flat.

The next operation is to retain the bridge-piece 30 in exactly the form shown in Fig. 1 and to bend each arm 31 away from the other of the pair into a position to form, of the two, straight arms 37 both at right angles to the length of the bridge piece as shown in Fig. 3. When this has been accomplished, the ends 33 are bent at right angles to the arms 37 and a longitudinal groove 38 is impressed on the front of each of these arms 37. This groove is an important feature of this invention. It is not possible to place it on the blank as shown in Fig. 1 or at least it would involve several operations, but when the arms are straightened out as shown in Figs. 3 and 4 the grooves can be pressed into them so as to give them a concavo-convex configuration. These grooves are to serve later for holding the lenses in the frame. At the same time the opposite surface is made convex to provide, for example, the form shown in Fig. 9. It will be observed that the blank shown in Fig. 3 is all located in one plane except that the ends 33 are bent down at right angles.

Now, without further operating on the arms 37 or the ends 33, the bridge piece 30 is modified in shape until it is bent to the form it is to have in the completed spectacle. This involves bowing it at the center and shifting it laterally out of alignment to a slight extent and then bending its ends over into position parallel to each other but at right angles still to the arms 37. This is accomplished by turning these ends around ninety degrees from the position shown in Fig. 3 so that the arms 37 are turned through the arc. This brings the grooves 38 from the position in which they are both on the same side of the blank to one in which they are opposite each other and both face outwardly. This is the form of the blank as it appears in Figs. 5 and 6. It will be seen that the arms 37 are still straight, that the ends 33 project in toward each other, and that the bridge plate piece has now assumed its final shape.

With the parts in that position it is only necessary to bend the two arms 37 in the plane of both of them, but outwardly and around as shown in Figs. 7 and 8. The bending of these arms into circular or equivalent form brings the two ends 33 into flat contact. The lenses are now inserted and then the screws 35 can be applied and this part of the instrument is completed. The pivot pins 36 and temples T can be applied later.

The form of the cross section of the metal frame is shown in Fig. 9, illustrating the concavo-convex construction which provides the groove 38 for receiving the edge of the lens. It will be understood that ordinary minor shaping and finishing operations can be, and usually are, performed at several stages of the process described.

In the form shown in Figs. 10 and 11 there is practically no difference in the metal frame except that near the two ends 33 there are provided projections 40 or at least a roughened surface 45 by which a coating of sheet celluloid 46 can be held in position. It has been a difficult thing heretofore to provide a coating of celluloid to protect the metal because it was almost impossible to hold it in position, but by providing these projections in such form as to penetrate or extend entirely through the celluloid coating I have overcome this difficulty.

In applying this principle to the conformation of certain kinds of eyeglass frames it is somewhat simplified. In the form shown in Figs. 12 and 13 the flat blank is originally made with a long straight arm 51 having a groove 58 extending throughout its length and having ends 53. This is also provided with an offset arm 52 having a curvature throughout a quarter circle and provided with a flat projecting arm 50.

This blank, as originally produced, is usually finished by a smaller number of operations than the blank shown in the first sheet, because the arm 51 is bent right around into a circular or elliptical form as shown in Fig. 14, and the parts 50-52 do not have to be changed at all. The two ends 53 are united by a screw 55 and the lens is held in the groove 58 as in the other case. Two of these, right and left handed, are finished up by providing stops 56 and other required elements and assembled with a spring as shown in Fig. 16.

A much simpler article can be made according to this invention by cutting out a flat blank shown in Fig. 17, comprising a straight arm or rod 61 having a groove 68 on one side throughout its length and two ends 63, one of them having a handle 66 integral with it. This rod is brought around in the simplest possible way to bring the two ends into contact and they are secured together by screws 65. This provides a flat frame for a single lens.

The invention also can be carried out for the production of a microscope frame, such as shown in Figs. 21 and 22 by stamping out a blank in the first place as shown in Fig. 19. This has a strut 70 and two arms 71 connected with the strut by curved parts 72 just as shown in Fig. 1 having the ends 73 as shown therein with the perforations 74. On the other end of the strut 70 is a closed figure 76 all in a plane.

By additional operations this flat blank is shaped so as to keep the strut 70 in its original form and enlarge the figure 76 into a circular or other desired form. The two arms 71 and their curved parts 72 are straightened out to a position at right angles to the strut 70 and a groove 78 impressed therein on the flat front side. The ends 73 are bent backwardly into parallel position. These two arms are then bent around until the ends 73 engage, the lens is applied and then a screw 75 is used to secure the ends together. The two parts 71 and 76 are then bent into parallel planes at the opposite ends of the strut 70 to form the frame desired, the parts 76 constituting the base and the part 71 the lens holder.

From what has been said it will be seen that a method is provided which avoids the waste of stock that would be necessary if a blank like that shown in Fig. 3 were first cut out of the sheet metal, and also avoids soldering or other union of the several members of which the frame is composed.

It will be observed that the principle is applicable to several different devices of widely different character and that it can be applied to some of them with very little manipulation. The principal advantage over the methods commonly used is that it reduces by about fifty per cent the number of operations necessary for the perfection of articles of the class described. It also avoids soldered or welded joints.

Although I have illustrated and described certain definite uses of this process I am aware of the fact that it can be employed for producing other articles and can be modified materially without departing from the scope of the invention as expressed in the claims. Therefore I do not wish to be limited to the particular articles illustrated or to the exact order of steps described, but what I do claim is:—

1. The method of making a frame which consists in stamping a blank out of sheet material in flat form and providing it with two arms parallel with each other, bending each arm of said pair away from the other in their plane until they are straight and in alignment so as to form a straight arm, and thereafter bending said arm in its own plane to form a closed figure for receiving the edge of a lens or the like.

2. The method of making a metal frame which consists in stamping a flat blank with a flat arm having an end enlargement in its plane out of a sheet of metal, bending said arm in the plane to a straight position at an angle to its original position and bending the end enlargement at right angles thereto, then bending said arm so as to cause the sides of the two ends of the arm to approach each other to form a closed figure for receiving the edges of a lens or the like, and fastening said ends together.

3. The method of making a metal frame which consists in stamping a blank out of sheet metal in flat form having two parallel flat arms spaced apart, perforating the ends of the arms, bending the ends back parallel to each other, straightening the arms to form a single straight arm, bending the arms backwards into parallel planes, bending said arms so as to cause the sides of the two ends to approach each other to form a closed figure for receiving and holding the edges of a lens or the like, and fastening said ends together.

4. The method of making a metal frame which consists in stamping a blank with two opposite arms out of sheet metal in flat form, straightening the arms into alignment, impressing a groove along the flat surface of said straight arms, perforating the ends of the arms, bending them as a whole backwards into parallel planes transverse to the original plane of the blank, bending said arms in their own planes so as to cause the grooved sides of the two arms to approach each other to form a closed figure having a groove on its inner surface for receiving and holding the edges of a lens or the like, and fastening said ends together.

5. The method of making a metal frame which consists in cutting a blank from sheet metal to provide a central piece and a pair of arms projecting from one end of the central piece and located substantially parallel with each other, the ends of said arms being enlarged in their plane and each having a transverse perforation, straightening said arms out into alignment with each other at right angles to said central piece, impressing a groove along said arm centrally on a surface in the plane of the central piece, and bending said arms over until their perforated ends come into contact to form a closed figure with an internal groove surrounding it to hold a lens or the like.

6. The method of making a spectacle frame which consists in cutting a blank from sheet metal to provide a bridge piece and a pair of arms projecting from each end of the bridge piece and located substantially parallel with each other, the ends of said arms being enlarged and having a transverse perforation, said bridge piece, arms, and ends all being located in the same plane, straightening said arms out into alignment with each other in the plane of the bridge piece, bending said ends over into parallel position, forming a groove along each arm centrally, and bending said arms around toward the groove until their perforated ends come into contact to form a closed figure with an internal groove surounding it to hold a lens or the like.

7. The method of making a spectacle frame which consists in cutting a blank from sheet metal to provide a straight bridge piece, and a pair of arms projecting from one end of the bridge piece and located substantially parallel with each other, the ends of said arms being enlarged in their plane and having a transverse perforation, straightening said arms in their plane out into alignment with each other at right angles to said bridge piece, impressing grooves along said arms in the plane of the central piece, bending the bridge piece at its ends on which the said arms are located to a position at an angle to their original position, and bending said arms over until their perforated ends come into contact to form a closed figure with an internal groove surrounding it to hold a lens or the like.

8. The method of making a metal spectacle frame which consists in cutting a blank from the sheet metal to provide a bridge piece and a pair of straight arms projecting from each end thereof and located substantially parallel with each other, straightening said arms out into alignment with each other at right angles to said bridge piece and in its plane, impressing a groove along said arms centrally on one side, bending the bridge piece at its ends on which the said arms are located to a position at substantially ninety degrees to their original position, and thereafter bending said arms over in the plane of the original blank until their ends come into contact to form a closed figure with an internal groove surrounding it to hold a lens or the like.

9. The method of making a metal spectacle frame which consists in cutting a blank from sheet metal to provide a central bridge piece and a pair of arms projecting oppositely from each end and located substantially parallel with each other, and spaced slightly apart, straightening said arms out into alignment with each other in the same plane at right angles to said bridge piece, impressing a groove along each arm centrally on one of the original flat sides of the blank, bending the ends of the bridge piece to a position at substantially ninety degrees to their original position to bring the arms into a new plane, bending said arms over in a plane parallel with the original plane until their ends come into contact to form a closed figure with an internal groove surrounding it to hold a lens or the like, providing projections on said arms near their ends, applying a covering of celluloid or the like around the eye-pieces so formed, and fastening its ends thereto by said projections.

10. The method of making a metal frame which consists in cutting a blank from sheet metal to provide a central piece and a pair of arms projecting from one end of the central piece and located substantially parallel with each other, straightening said arms in their plane out into alignment with each other at right angles to said central piece, forming a groove along said arms centrally on one side, bending the central piece at its ends on which the said arms are located to a position at an angle to their original position, bending said arms over until their ends come into contact to form a closed figure with an internal groove surrounding it to hold a lens or the like, providing projections on said arms near their ends, applying a covering of celluloid or the like around the eye-pieces, and fastening its ends thereto by said projections.

In testimony whereof I have hereunto affixed my signature.

HORMIDAS TREMBLAY.